United States Patent
Park et al.

(10) Patent No.: US 9,146,804 B2
(45) Date of Patent: Sep. 29, 2015

(54) APPARATUS AND METHOD FOR DETECTING BIT SEQUENCE ROBUSTLY TO CHANGE OF DC OFFSET IN OOK RECEIVER

(71) Applicant: SAMSUNG ELECTRONICS CO., LTD., Suwon-si (KR)

(72) Inventors: Chang Soon Park, Chungju-si (KR); Young Jun Hong, Seoul (KR); Joon Seong Kang, Suwon-si (KR); Jong Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 14/012,016

(22) Filed: Aug. 28, 2013

(65) Prior Publication Data

US 2014/0173387 A1    Jun. 19, 2014

(30) Foreign Application Priority Data

Dec. 13, 2012  (KR) .................. 10-2012-0145351

(51) Int. Cl.
  *H03M 13/03*   (2006.01)
  *G06F 11/08*   (2006.01)
(52) U.S. Cl.
  CPC ..................... *G06F 11/08* (2013.01)
(58) Field of Classification Search
  CPC .............. G06F 11/08; H04L 25/03235; H04L 15/03191; H04L 1/0055
  USPC .................. 375/340, 341; 714/792, 795, 796
  See application file for complete search history.

(56) References Cited

U.S. PATENT DOCUMENTS

| | | | |
|---|---|---|---|
| 5,588,011 A * | 12/1996 | Riggle .......................... | 714/792 |
| 6,449,320 B1 | 9/2002 | Lindoff | |
| 6,507,927 B1 * | 1/2003 | Kalliojarvi ................... | 714/795 |
| 7,003,055 B2 * | 2/2006 | Sexton et al. ................ | 375/341 |
| 7,177,354 B2 | 2/2007 | Fimoff et al. | |
| 7,653,154 B2 * | 1/2010 | Haratsch ...................... | 375/341 |
| 8,201,064 B2 * | 6/2012 | Ferguson ..................... | 714/795 |
| 2007/0058763 A1 | 3/2007 | Otte et al. | |
| 2007/0189424 A1 * | 8/2007 | Haratsch ...................... | 375/340 |

FOREIGN PATENT DOCUMENTS

| | | |
|---|---|---|
| KR | 2002-0019934 A | 3/2002 |
| KR | 2003-0020436 A | 3/2003 |
| KR | 10-2011-0112878 A | 10/2011 |

* cited by examiner

*Primary Examiner* — David Ton
(74) *Attorney, Agent, or Firm* — NSIP Law

(57) ABSTRACT

A method of detecting a bit sequence, includes estimating parameters to be used to determine a probability distribution of a present signal in each of states of a present time, and calculating metrics of the respective states based on the parameters. The method further includes selecting survivor states from the states based on the metrics, and detecting the bit sequence based on a path to each of the survivor states.

25 Claims, 14 Drawing Sheets

APPARATUS AND METHOD FOR DETECTING BIT SEQUENCE ROBUSTLY TO CHANGE OF DC OFFSET IN OOK RECEIVER

CROSS-REFERENCE TO RELATED APPLICATION

This application claims the benefit under 35 USC 119(a) of Korean Patent Application No. 10-2012-0145351, filed on Dec. 13, 2012, in the Korean Intellectual Property Office, the entire disclosure of which is incorporated herein by reference for all purposes.

BACKGROUND

1. Field

The following description relates to an apparatus and a method for detecting a bit sequence robustly to change of a direct current (DC) offset in an on-off keying (OOK) receiver.

2. Description of Related Art

Owing to high speed development and commercialization of wireless networks, sensor networks are rapidly spreading. Also, due to the Institute of Electrical and Electronics Engineers (IEEE), technological standardizations, such as Bluetooth, IEEE 802.15.4, and ZigBee, are being actively achieved. Wireless sensor networks may be applied to various fields, such as home security, medical fields, mobile healthcare, monitoring of chemical/biological abnormalities, diagnosis of abnormalities and disorders of machinery, environment monitoring, disaster information sensing, intelligent distribution management, real-time security, and remote monitoring.

In such various wireless sensor networks and near field communication (NFC) networks, sensors need to be small in size. Also, a large number of the sensors need to operate with low power and low complexity for a long time. For example, in a wireless body area network (WBAN), which is installed on a human body to wirelessly communicate with a mobile device or another human body that are proximately located, sensors may need to operate with low complexity and lower power more strictly.

For sensors to operate with low complexity and lower power, an ultra low power (ULP) radio frequency (RF) structure may be used rather than a conventional high power RF structure. However, when a ULP analog circuit is used, performance may be reduced.

SUMMARY

In one general aspect, there is provided a method of detecting a bit sequence, the method including estimating parameters to be used to determine a probability distribution of a present signal in each of states of a present time, and calculating metrics of the respective states based on the parameters. The method further includes selecting survivor states from the states based on the metrics, and detecting the bit sequence based on a path to each of the survivor states.

In another general aspect, there is provided an apparatus that detects a bit sequence, the apparatus including an estimation module configured to estimate parameters to be used to determine a probability distribution of a present signal in each of states of a present time, and a calculation module configured to calculate metrics of the respective states based on the parameters. The apparatus further includes a selection module configured to select survivor states from the states based on the metrics, and a detection module configured to detect the bit sequence based on a path to each of the survivor states.

Other features and aspects will be apparent from the following detailed description, the drawings, and the claims.

DETAILED DESCRIPTION

Figure 1:
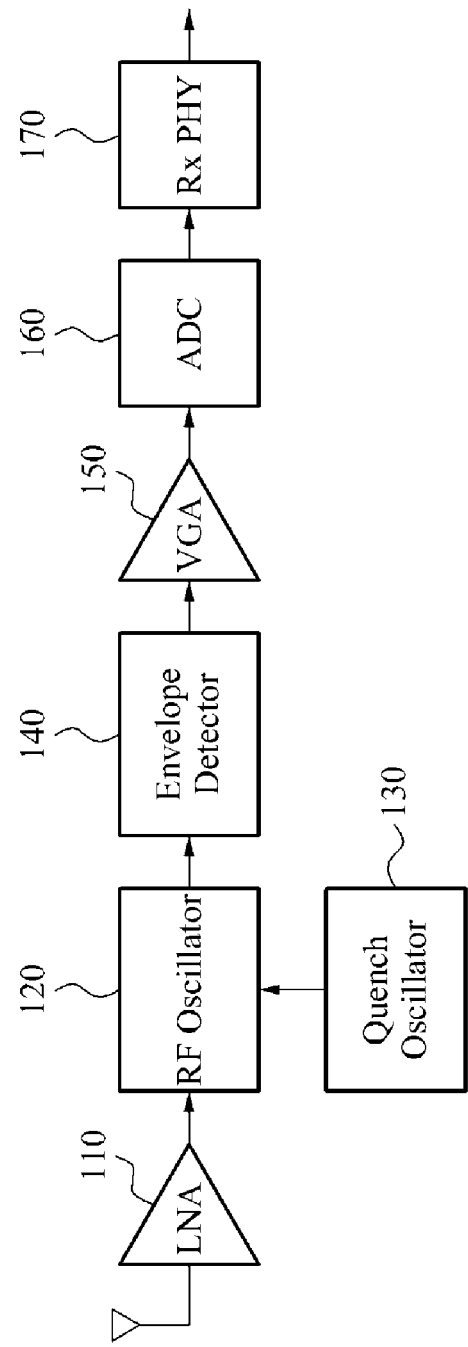
FIG. 1 is a diagram illustrating a low power receiver according to a prior art.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Each of various sensor devices installed in a wireless sensor network and/or a near field communication (NFC) network may need to meet conditions of a small size, low power, and low complexity. A super heterodyne radio frequency (RF) structure may increase performance, such as sensitivity, by utilizing a middle frequency band without converting from a high frequency band directly to a base band. However, complexity, cost, and power consumption may be increased.

In more detail, in the super heterodyne RF structure, an RF portion may need extremely high power in comparison to a digital baseband portion. For example, in a chip for a low power wireless personal area network (WPAN) (IEEE 802.15.4), a portion that processes a digital signal may need about 0.5 mW to both receive and transmit. Conversely, a portion that processes an analog signal may consume about 21 mW in a receiving mode and about 30 mW in a transmitting mode, that is, about 40 to 60 times higher than the digital signal processing portion.

Therefore, a super regenerative receiver including an RF structure that uses a small number of active elements may be used as an ultra low power (ULP) receiver. The super regenerative receiver detects a signal by amplifying an output signal, using a positive feedback structure with respect to received signals.

For low power and low complexity, a non-coherent modulation technology may be effective. For example, non-coherent modulation methods, such as non-coherent on-off keying (OOK) or non-coherent frequency shift keying (FSK), may include determining, by an envelope detector, presence of signals.

Non-coherent modulation and demodulation methods may show relatively low performance in comparison to coherent modulation and demodulation methods. However, synchronization that needs high cost to obtain an accurate carrier phase value may be omitted.

In addition, the non-coherent modulation and demodulation methods may omit use of components that needs high power, such as a mixer and/or a linear amplifier in an in-phase/quadrature-phase (I/Q) structure. Accordingly, the non-coherent modulation and demodulation methods may save power and reduce structural complexity. For example, an RF receiver for ULP reception and transmission may use a low power, low complexity modulation technology, such as non-coherent OOK.

An NFC transmission system using the low power, low complexity RF structure and modulation method may considerably reduce power consumption. However, due to performance reduction of processing an analog signal and non-ideal characteristics, performance of the NFC transmission system may be reduced. Hereinafter, a super regenerative receiver as a low power receiver will be described.

FIG. 1 illustrates a super regenerative receiver according to a prior art. Referring to FIG. 1, a low noise amplifier (LNA) 110 receives an RF signal, and transmits the RF signal to an RF oscillator 120. For example, the RF oscillator 120 may be a super regenerative oscillator (SRO). The RF oscillator 120 amplifies the RF signal of a frequency by a positive feedback loop to generate an oscillation signal.

However, since the amplification causes oscillation, an operation to stop the oscillation of the RF oscillator 120 is needed. Accordingly, a quench oscillator 130 controls periodic occurrence and disappearance of the oscillation.

For example, when a transmission end applies non-coherent OKK modulation to the RF signal, and transmits the RF signal corresponding to a transmission symbol "1", the RF oscillator 120 may generate a relatively large oscillation signal controlled by the quench oscillator 130. Conversely, when the transmission end applies the non-coherent OKK modulation to the RF signal, and transmits the RF signal corresponding to a transmission symbol "0", the RF oscillator 120 may not oscillate, but may generate a relatively small oscillation signal due to noise.

An envelope detector 140 receives the oscillation signal. The envelope detector 140 detects an envelope of the oscillation signal generated by a high frequency to generate an output signal. Different from if a coherent modulation is applied to the RF signal, when the non-coherent OOK modulation is applied to the RF signal, the envelope detector 140 may always generate a positive output signal.

Since the output signal of the envelope detector 140 may include a very low intensity, high amplification of the output signal may be needed to detect a signal in a digital baseband. An amplification intensity of the output signal of the envelope detector 140 may need to be adjusted based on a distance between a transmitter and a receiver. Therefore, a variable gain amplifier (VGA) 150 receives the output signal, and adjusts the amplification intensity of the output signal based on the distance between the transmitter and the receiver to generate an amplified signal. For example, the VGA 150 may adjust the amplification intensity of the output signal up to about 40 dB. Therefore, when the output signal includes DC offset components, the output signal may saturate an entire circuit if excessively amplified.

Next, the amplified signal is passed through an analog-to-digital converter (ADC) 160 and a receiving physical layer (Rx PHY) 170. Signal waveforms of blocks of the super regenerative receiver will be described with reference to FIG. 2.

Figure 2:
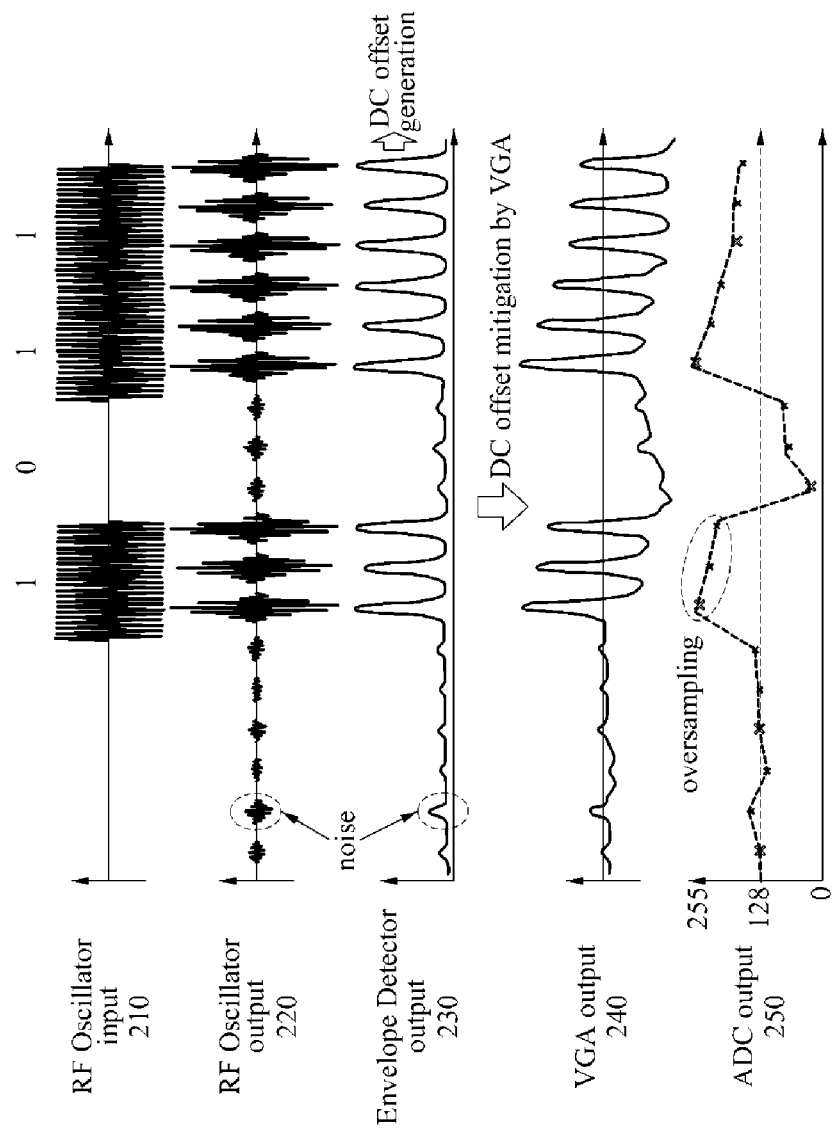
FIG. 2 is a diagram illustrating signal waveforms of blocks of the low power receiver of FIG. 1.

FIG. 2 illustrates signal waveforms of blocks of the super regenerative receiver of FIG. 1. Referring to FIG. 2, transmission symbols "1" modulated by a non-coherent OOK modulation is shown as an RF oscillator input signal 210 of an RF oscillator. An oscillating signal waveform with respect to the RF oscillator oversampling three times for each of the transmission symbols "1" is shown as an RF oscillator output signal 220 of the RF oscillator.

As shown in FIG. 2, an envelope detector output signal 230 of an envelope detector always includes a positive value. Therefore, to remove DC offset generation or components and maintain low power, a VGA includes frequency response characteristics to remove, suppress, or mitigate low frequency components. Thus, a VGA output signal 240 of the VGA includes a mean value of 0, and swings in both directions of a negative value and a positive value. That is, since the DC offset components are mitigated, when the same transmission symbols of "0" or "1" are successively transmitted, the VGA output signal 240 may not maintain an amplitude of the same transmission symbols, but may approximate to a mean value, that is, zero volts (V). Therefore, although the DC offset components are removed in view of a considerably long period, a DC offset value may fluctuate during a time period per symbol based on whether the same transmission symbols successively occur.

An ADC outputs an ADC output signal 250 including a digital output value from 0 to 255, using an 8-bit resolution bit. In non-coherent OOK modulation and demodulation, in determining whether the transmission symbol is "0" (off) or "1" (on), setting of a threshold used to determine a presence of signals may highly influence a bit error rate. Therefore, characteristics of the VGA, that is, the mitigation of the DC offset, may cause distortion of the ADC output signal 250 of the ADC, that is, an input value of a digital baseband, thereby reducing the bit error rate. To this end, in examples described herein, the threshold may be adaptively set to efficiently cope with time-varying DC offset fluctuation in a low power, non-coherent OOK receiver, thereby increasing the bit error rate.

In addition, the examples described below are applied to not only the super regenerative receiver. That is, the following examples may be applied to other modulation and demodulation methods besides a non-coherent OOK method and a coherent method, to cope with similar cases.

Figure 3:
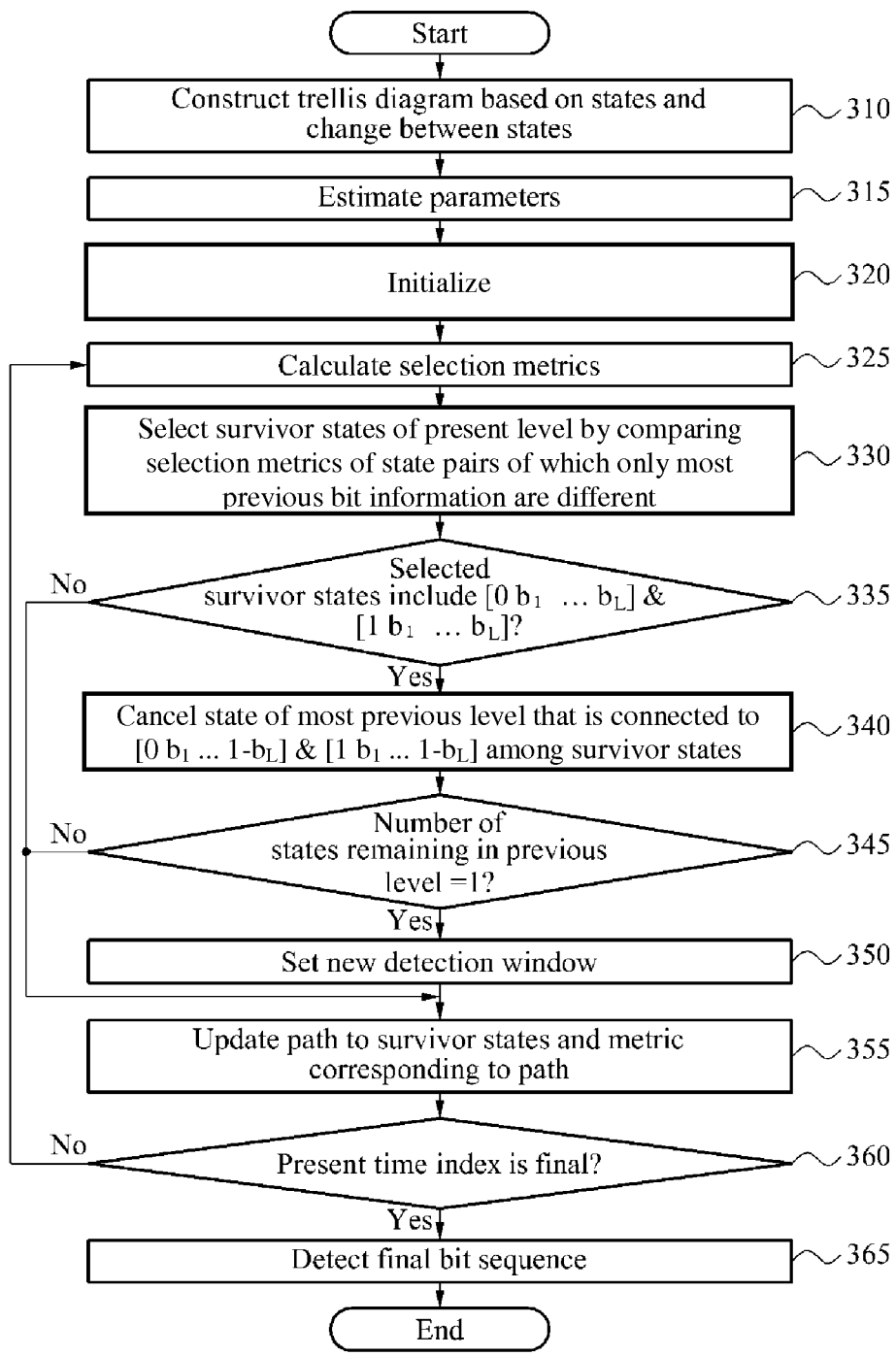
FIG. 3 is a flowchart illustrating an example of a method of detecting a bit sequence.

FIG. 3 illustrates an example of a method of detecting a bit sequence. Referring to FIG. 3, an apparatus that detects the bit sequence (hereinafter, a detection apparatus) detects an optimal bit sequence at a low complexity to effectively improve a reduction in a bit error rate, in a receiver in which a DC offset fluctuates based on a degree of continuity of same transmission symbols. Therefore, data detection is performed in units of a bit sequence including a temporal arrangement of bit symbols, not in units of a bit symbol.

In further detail, pieces of previous transmission bit information influencing a probability distribution of a present received signal, and a present transmission bit information, are constructed into a state. Transitions between states that may be generated are constructed into a trellis form.

In operation 310, the detection apparatus constructs a trellis diagram based on states and changes (or transitions) between the states. Each of the states includes a present transmission bit and at least one previous transmission bit that influence a probability distribution of a present received signal.

In operation 315, the detection apparatus estimates parameters, each of which is used to determine the probability distribution of the present received signal in a respective state of a present level. The detection apparatus may estimate the parameters, using a preamble of a predetermined data pattern.

In operation 320, the detection apparatus initializes the method of detecting the bit sequence. During the initialization, a value corresponding to an initial state is set in constructing the trellis diagram. During the initialization, transmission bit values in the preamble during transmission and reception may be used.

In operation 325, the detection apparatus calculates selection metrics of respective states of the present level based on the estimated parameters. The selection metrics are used to select respective states of the present level in the trellis diagram based on received signals provided so far. Each of the selection metrics includes the probability distribution that the present received signal is observed in the respective state.

In operation 330, the detection apparatus selects survivor states of the present level, each of which includes a relatively high occurrence rate, among the states, based on the selection metrics of respective states in each of state-pairs. In more detail, the detection apparatus selects the survivor states of the present level by comparing the selection metrics of respective states in each of state-pairs of which only most previous bit information are different, among the state-pairs.

In operation 335, the detection apparatus determines whether the selected survivor states include a state-pair of which only a latest received bit symbol is different while all other bit symbols are the same, for example, $[0, b_1, b_2, \ldots, b_k, \ldots, b_L]$ and $[1, b_1, b_2, \ldots, b_k, \ldots, b_L]$. In this example, $b_k$ refers to a k-th previous transmission bit from the present, and may include a value "0" or "1". When the selected survivor states are determined to include the state-pair, for example, $[0, b_1, b_2, \ldots, b_k, \ldots, b_L]$ and $[1, b_1, b_2, \ldots, b_k, \ldots, b_L]$, the detection apparatus continues in operation 340. Otherwise the detection apparatus continues in operation 355.

In operation 340, the detection apparatus cancels any one state among the states selected from a most previous level. That is, the detection apparatus cancels a state of a most previous level that is connected to a state-pair, for example, $[0, b_1, b_2, \ldots, (1-b_L)]$ and $[1, b_1, b_2, \ldots, (1-b_L)]$ among the survivor states, e.g., a state-pair different from the state-pair of the selected survivor states.

In operation 345, the detection apparatus determines whether a number of states remaining in the previous level is one. The previous level includes a previous time period or previous time index. When the number of the remaining states is determined to be one, the detecting apparatus continues in operation 350. Otherwise the detecting apparatus continues in operation 355.

In operation 350, the detection apparatus sets a new detection window to start from the present level. That is, after estimation of a bit sequence until the most previous level is performed, the detection apparatus sets the detection window to start estimation of the bit sequence in the present level.

In operation 355, the detection apparatus updates a path to each of the survivor states that reflects the state that is canceled, and a metric corresponding to the path to each of the survivor states. Various methods may be used for the update. Also, when the state is canceled in operation 340, the detection apparatus may store connection information of the survivor states along with the path, which refers to the update of the path to each of the survivor states. In addition, the detection apparatus may store and update the selection metric of the path, which refers to the update of the metric corresponding to the path to each of the survivor states.

In operation 360, the detection apparatus determines whether a present time index is final. When the present time index is determined to be final, the detection apparatus continues in operation 365. Otherwise, the detection apparatus returns to operation 325.

In operation 365, the detection apparatus detects a final bit sequence based on the path to each of the survivor states that reflect the state that is canceled.

Figure 4:
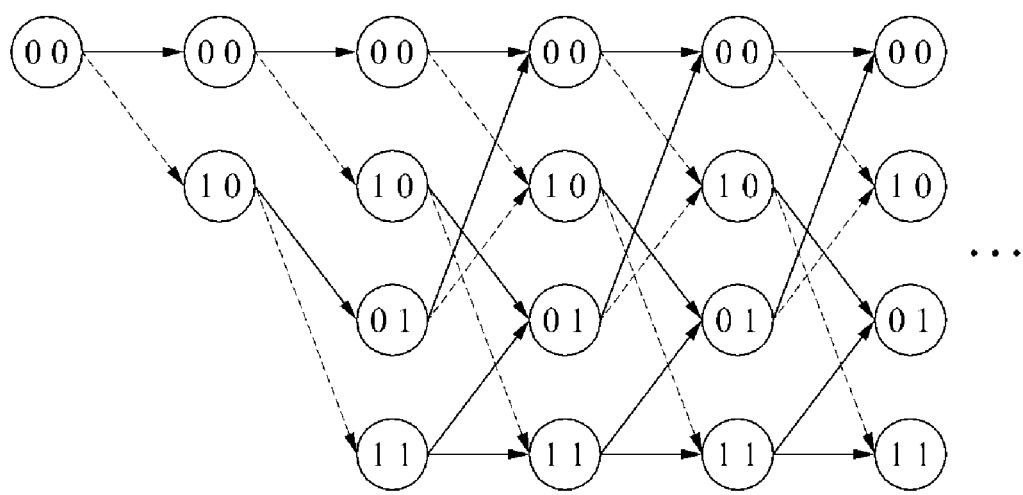
FIG. 4 is a diagram illustrating an example of states and a trellis diagram constructed when L=1.

FIG. 4 is a diagram illustrating an example of states and a trellis diagram constructed when L=1. As aforementioned, a time-varying DC offset fluctuation may reduce reception performance. The time-varying DC offset fluctuation may be expressed in different types of probability distributions based on successive occurrences of a transmission symbol.

For example, an ideal case may be when a noise is ignored and the DC offset fluctuation is absent. When the transmission symbol is "1", an ADC output of an ADC that corresponds to a baseband input may include a value A. When the transmission symbol is "0" the ADC output may include a value B. The value A may be greater than the value B. When a DC offset component of an ADC input signal is zero, the ADC output may include a mid value between A and B.

In another example, the noise is ignored, and the DC offset fluctuation is present. When a first transmission symbol is "1" and a second transmission symbol is also "1", the ADC output of the second transmission symbol may be less than the value A. According to the same principle, when the first transmission symbol is "0" and the second transmission symbol is also "0", the ADC output of the second transmission symbol may be greater than the value B. This phenomenon may be caused due to a VGA, that is, a signal processing block that mitigates the DC offset operating at a front end of the ADC to reduce power consumption and prevent saturation of an entire circuit. In other words, although the ADC output may include the value A in the beginning, when the same transmission symbols successively occur, the ADC output may regress to a mean value of the two transmission symbols, that is, the mid value between A and B, to mitigate the DC offset.

When different transmission symbols alternately occur rather than that the same transmission symbols successively occur, the ADC output may maintain the values A and B in an alternating manner. That is, the values A and B are maintained in the alternating manner when the DC offset is absent. Therefore, the different types of the probability distribution may be based on whether a previous bit and a current bit are same or different.

The performance reduction caused by the DC offset fluctuation may be overcome using a probability distribution based on a degree of continuity of the same transmission symbols in a method of detecting a bit sequence. Hereinafter, the method of detecting the bit sequence will be described in detail.

A sequence of an N-number of transmission bits is $m_{seq}=[m(N), m(N-1), \ldots, m(2), m(1)]$, an i-th transmission bit is $m(i)$ and a sequence of received signals received from an ADC output is $y_{seq}=[y(N), y(N-1), \ldots, y(2), y(1)]$ A decision rule to decide on an optimal transmission bit sequence $\hat{m}_{seq}$ used to minimize a bit error rate may be expressed by the following example of Rule 1:

Choose the estimate $\hat{m}_{seq}$ for which $f(m_{seq}, y_{seq})$ is maximum (1)

In Rule 1, $f(m_{seq}, y_{seq})$ denotes a joint probability of a transmission bit sequence $m_{seq}$ and a reception bit sequence $y_{seq}$.

That is, the decision rule of Rule 1 means that, when the reception bit sequence $y_{seq}$ is observed, the bit sequence $m_{seq}$ including a highest joint probability with $y_{seq}$ among all transmission bit sequences $m_{seq}$ being transmissible is the optimal transmission bit sequence $\hat{m}_{seq}$ used to minimize the bit error rate.

However, since a number of the transmission bit sequences $m_{seq}$ being transmissible is $2^N$, objects of comparison increases by geometric progression according to N. That is, it is impracticable to compare the different transmission bit sequences being transmissible.

When values of the received signals with respect to the transmission bits transmitted at different times are independent in terms of probability, the joint probability may be expressed by product of probabilities between a transmission bit and a reception bit of every transmission time. Accordingly, the DC offset fluctuation may be prevented.

However, in a receiver including the DC offset fluctuation, the transmission bits of different transmission times may cause a probability distribution subject to the received signal. Therefore, to perform optimal bit sequence detection in terms of probability, data detection may be performed in units of a bit sequence corresponding to a temporal arrangement of bit symbols, not in units of a bit symbol. Also, it is still necessary to overcome the aforementioned limits.

Presuming that the DC offset fluctuation occurs and therefore an L-number of previous transmission bits and the present transmission bit influence the probability distribution of the present received signal, the transmission bit influencing the probability distribution of y(i) may be $m(i), m(i-1), \ldots, m(i-L)$. In this example, L is a number of the previous transmission bits influencing the probability distribution of the present received signal.

A sequence including the i-th transmission bit to an (i-L)-th transmission bit may be expressed by $m(i)=[m(i), m(i-1), \ldots, m(i-L)]$. For example, when L=2, $m(i)$ and $m(i-1)$ in the transmission bit sequence may be expressed as shown in the following example:

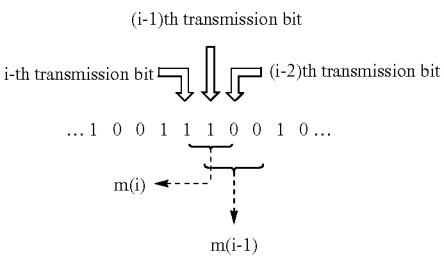

In this example, the joint probability $f(m_{seq}, y_{seq})$ with respect to the transmission bit sequence $m_{seq}$ and the reception bit sequence $y_{seq}$ may be derived as shown in the following example of Equation 1:

$$f(m_{seq}, y_{seq}) = \prod_{i=1}^{N} f(y(i)|m(i))P(m(i)|m(i-1))P(m(0)) \quad (1)$$

In Equation 1, $f(y(i)|m(i))$ denotes a conditional probability with respect to $y(i)$ when $m(i)$ is provided. $P(m(i)|m(i-1))$ denotes a conditional probability with respect to $m(i)$ when $m(i-1)$ is provided. In addition, $P(m(0))$ denotes a probability with respect to an initial value of $m(i)$.

When $m(0)$ is provided as a predetermined value, $f(m_{seq}, y_{seq})$ may be expressed by the following example of Equation 2:

$$f(m_{seq}, y_{seq}) = \prod_{i=1}^{N} f(y(i)|m(i))P(m(i)|m(i-1)) \quad (2)$$

In Equation 2, $f(m_{seq}, y_{seq})$ is expressed by accumulating products of a probability that a transmission bit sequence including a length L+1 including information of a previous transmission bit changes from $m(i-1)$ to $m(i)$, and a probability that the received signal becomes $y(i)$ when $m(i)$ is provided, every time the transmission bit is transmitted. When $m(i)$ is defined as a state and transition between states according to time is indicated by an arrow, $f(m_{seq}, y_{seq})$ may be more easily understood and realized with lower complexity.

Since $m(i)$ includes (L+1) number of bit elements, a maximum number of different states in the particular transmission time may be $2^{L+1}$. Therefore, information on the L-number of the previous transmission bits influencing the probability distribution of the present received signal and information on the present transmission bit may be constructed as one state. The transition between the states that may be generated may be constructed in a trellis form.

When L=1, $m(i)$ may include four different states. For example, presuming that an initial state is [0 0], when a solid line arrow indicates that the present transmission bit is 0 and a dotted line arrow indicates that the present transmission bit is 1, the trellis diagram is expressed as shown in FIG. 4.

In FIG. 4, a leftmost state [0 0] refers to the initial value. According to a subsequent transmission bit is 0 or 1, transition of the states are generated in directions of rightward arrows, respectively.

When the transmission bits 0 and 1 occur equally by probability of ½ at a time, when a particular state is provided, a probability $P(m(i)|m(i-1))$ that the particular state transits to next two states may also be ½, respectively. Since the transition may not always occur between different states, paths in which the transition may not occur are not linked by arrows. For example, in this case. P(m(i)|m(i−1)) may be zero.

Therefore, when transition progresses from the left to the right only along paths including solid line arrows in the trellis diagram of FIG. 4, the joint probability f($m_{seq}$, $y_{seq}$) may be expressed as shown in the following example of Equation 3:

$$f(m_{seq}, y_{seq}) = \frac{1}{2^N} \prod_{i=1}^{N} f(y(i) | m(i)) \quad (3)$$

In Equation 3, since a component $\frac{1}{2^N}$ is constant with respect to all paths, the optimal decision rule to minimize the bit error rate may be rephrased by the following example of Rule 2:

$$\text{Choose the estimate } \hat{m}_{seq} \text{ for which} \prod_{i=1}^{N} f(y(i) | m(i)) \text{ is maximum} \quad (2)$$

Based on the decision rule and the state trellis diagram, the bit sequence may be estimated by low complexity.

In another example, the estimation may be further simplified using two-pair transition characteristics as follows during transition of the states in the state trellis diagram. That is, characteristics of the two-pair transition will be described, the transition between two states [$b_1$, $b_2$, . . . , $b_L$, 0] and [$b_1$, $b_2$, . . . , $b_L$, 1] in which only most previous bit symbols are different while other bit symbols are same in m(j−1) corresponding to a state of when a (j−1)-th bit is transmitted, and two states [0, $b_1$, $b_2$, . . . , $b_L$] and [1, $b_1$, $b_2$, . . . , $b_L$] in which only last bit symbols are different while other bit symbols are same in m(j) corresponding to a state of when a j-th bit is transmitted. The transition between the two pairs may be expressed by FIG. 5.

Figure 5:
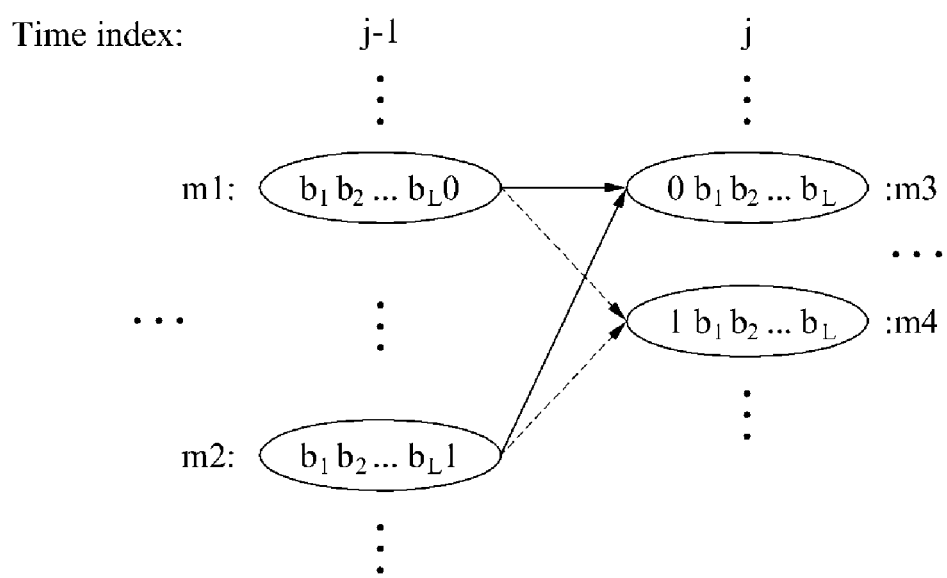
FIG. 5 is a diagram illustrating an example of state-pairs constructed based on a transition between states.

FIG. 5 illustrates an example of state-pairs constructed based on a transition between states. In FIG. 5, for a convenient explanation, the states will be referred to as $m_1$= [$b_1$, $b_2$, . . . , $b_L$, 0], $m_2$=[$b_1$, $b_2$, . . . , $b_L$, 1], $m_3$=[0, $b_1$, $b_2$, . . . , $b_L$], and $m_4$=[1, $b_1$, $b_2$, . . . , $b_L$].

In this example, $m_3$ denotes a state generated by transition from $m_1$ and $m_2$. Two different paths passing through $m_1$ and $m_2$ may have different values of conditional probabilities $$\prod_{i=1}^{N} f(y(i) | m(i))$$

until the state $m_3$, where j is a time index. However, since particular paths afterwards pass through same states, the conditional probabilities may have same values. Therefore, only one path may be selected between the two different paths passing through $m_1$ and $m_2$ in the state $m_3$.

To expand, a conditional probability of a particular path to $m_1$ will be referred to A and a conditional probability of a particular path to $m_2$ will be referred to B. Therefore, a conditional probability of a path passing through $m_1$ to $m_3$ may be $$\prod_{i=1}^{j} f(y(i) | m(i)) = A \cdot f(y(j) | m(j)) = A \cdot f(y(j) | m_3),$$

and a conditional probability of a path passing through $m_2$ to $m_3$ may be $$\prod_{i=1}^{j} f(y(i) | m(i)) = B \cdot f(y(j) | m(j)) = B \cdot f(y(j) | m_3).$$

To compare the two conditional probabilities, since f(y(j)|$m_3$) is common, the path passing through $m_1$ to $m_3$ may be selected when A>B, and the path passing through $m_2$ to $m_3$ may be selected when A≤B.

In this example, $m_4$ denotes a state generated by transition from $m_1$ and $m_2$. Through the same process as the above, conditional probabilities A·f(y(j)|$m_4$) and B·f(y(j)|$m_4$) may be compared. A path passing through $m_1$ to $m_4$ may be selected when A>B, and a path passing through $m_2$ to $m_4$ may be selected when A≤B.

To summarize, with respect to the pairs of the two paths, the path passing through $m_1$ to $m_3$ may be selected when A>B, and the path passing through $m_2$ to $m_3$ may be selected when A≤B. That is, among the states selected at a (j−1)-th bit transmission time, either of $m_1$ and $m_2$ may be selected rather than both.

State-pairs may be constructed by two states of which only information on the most previous bit are different while the other bits are same in a transmission time index j−1 of a particular bit. That is, only one may be selected from each state-pair by comparing quantities of the conditional probabilities $$\prod_{i=1}^{j-1} f(y(i) | m(i)).$$

Therefore, although the total number of different states at the transmission time of the particular bit is $2^{L+1}$, ½ of the total number, that is, $2^L$, of states may be selected through quantity comparison of the state-pairs. This may be referred to as signal processing of "current level half-cardinality state selection based on state-pairs". Next, after a state is selected at the (j−1)-th bit transmission time, when transition occurs from two selected states to states of a j-th bit transmission time, the bit sequence may be detected with low complexity based on characteristics of the transition.

It may be presumed that the two states selected after the state is selected at the (j−1)-th bit transmission time are $m_1$= [$b_1$, $b_2$, . . . , $b_{L−1}$, 0, x] and $m_2$=[$b_1$, $b_2$, . . . , $b_{L−1}$, 1, y]. In this example, x and y may be 0 or 1, which is a random value obtained by the method of selecting the state described above. In this example, the transition in the states $m_1$ and $m_2$ may occur as shown in FIG. 6.

Figure 6:
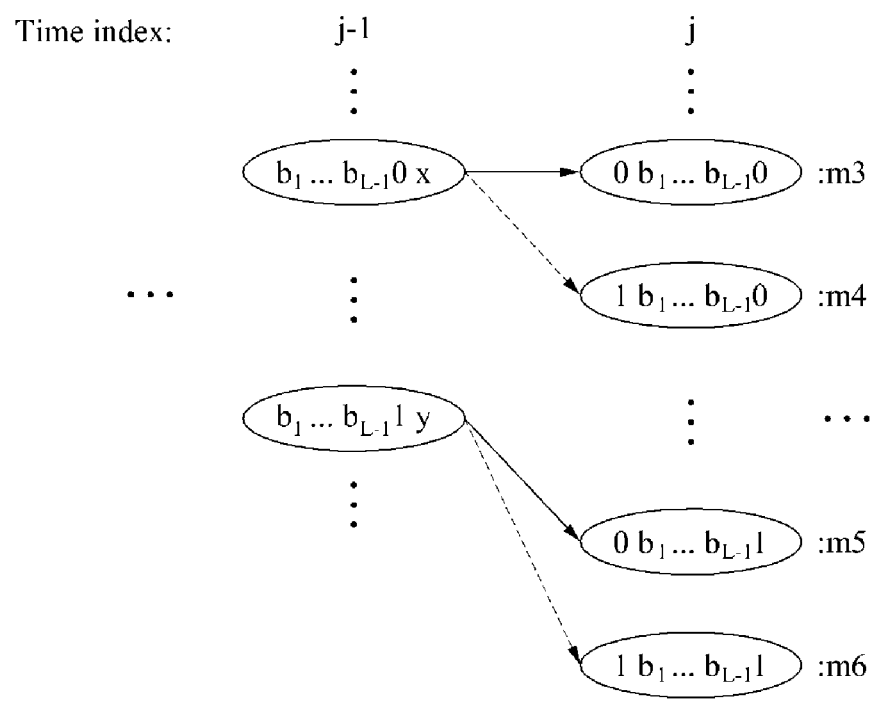
FIG. 6 is a diagram illustrating an example of a transition between states that is generated at a transmission time of a next bit after a state is selected at a transmission time of a bit.

FIG. 6 illustrates an example of a transition between states that may be generated at a transmission time of a next bit after a state is selected at a transmission time of a bit. In FIG. 6, it is presumed that $m_3$=[0, $b_1$, $b_2$, . . . , $b_{L−1}$, 0], $m_4$=[1, $b_1$, $b_2$, . . . , $b_{L−1}$, 0], $m_5$=[0, $b_1$, $b_2$, . . . , $b_{L−1}$, 1], and $m_6$=[1, $b_1$, $b_2$, . . . , $b_{L−1}$, 1].

When the states are selected in the j-th bit transmission time, as aforementioned, conditional probabilities may be compared between $m_3$ and $m_5$ and between $m_4$ and $m_6$. Conversely, when $m_3$ are $m_4$ selected, the state $m_2$ selected at the (j−1)-th bit transmission time may be omitted and not considered in selecting a path afterward. Conversely, when $m_5$ are $m_6$ selected, the state $m_1$ selected at the (j−1)-th bit transmission time may be omitted and not considered in selecting a path afterward.

As can be appreciated from the above, when two states of which only latest bit symbols are different while the other bit symbols are same are selected from the states selected at the particular transmission time, one of states selected at a previous transmission time may be additionally canceled. In addition, as can be understood from FIG. 6, the additionally canceled state of the previous transmission time may be a state connected to state-pairs of which only the most previous bit information is different when compared to state-pairs selected at a present transmission time. This may be referred to as "previous level state cancellation based on the state-pairs".

When the previous level state cancellation based on the state-pairs is performed, when the number of states remaining in the previous level is reduced to 1, only one path may have been considered. Therefore, in this example, all bit sequence information until the previous level may be determined. In addition, a new detection window may be set from a present level through detection window update. Block diagrams of detection apparatuses according to embodiments based on the foregoing description will be described with reference to FIGS. 13 and 14.

Figure 7:
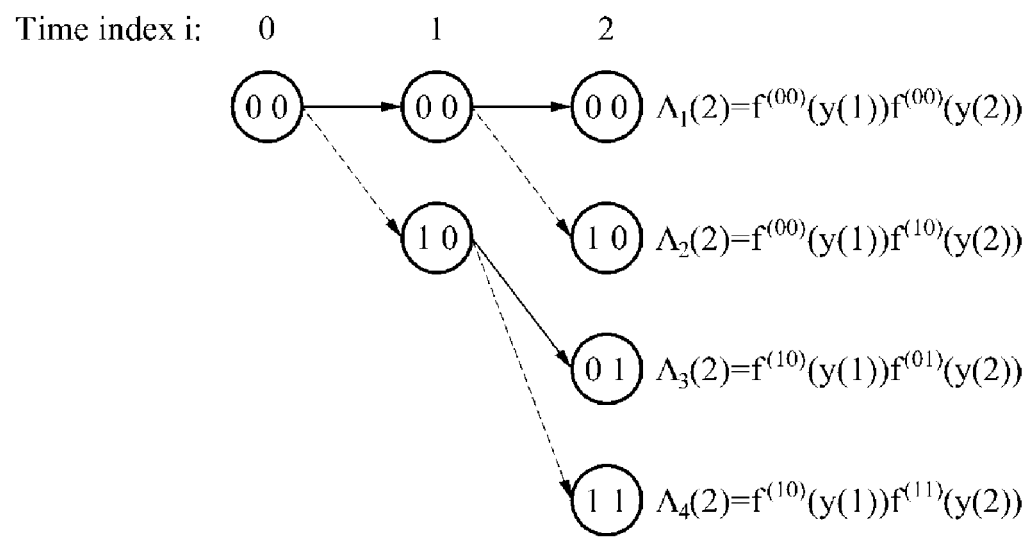
FIG. 7 is a diagram illustrating an example of a trellis diagram of until a time index i=2 when L=1, and selection metrics in the trellis diagram.

FIG. 7 illustrates an example of a trellis diagram of until a time index i=2 when L=1 and selection metrics in the trellis diagram. Referring to FIG. 7, since L=1, maximally four different states may be generated, that is, $S_1$=[0 0], $S_2$=[1 0], $S_3$=[0 1], and $S_4$=[1 1].

A selection metric with respect to a path connected to a k-th state $S_k$ in the time index i in units of a transmission bit are referred to as $\Lambda_k(i)$. Survivor metrics $\lambda_a(i)$ and $\lambda_b(i)$ may refer to selection metrics with respect to a remaining path after the state is selected or removed using the selection metrics. For example, when an initial state is [0 0], the state trellis diagram until the transmission time index i=2 and selection metrics $\Lambda_k(2)$ corresponding to the respective paths may be expressed as shown in FIG. 7. In this example, $f^{(m(i))}(y(i))$ refers to a conditional probability with respect to the received signal y(i) in the state m(i), which may be identical to f(y(i)|m(i)) described above.

Figure 8:
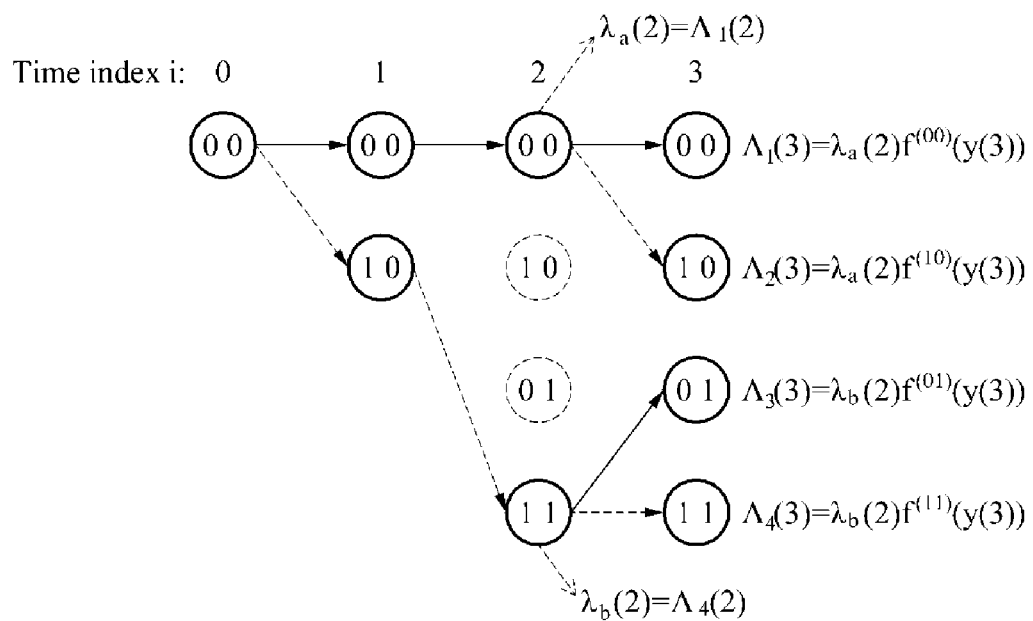
FIG. 8 is a diagram illustrating an example of a trellis diagram of until a time index i=3 when L=1, and selection metrics in the trellis diagram.

FIG. 8 illustrates an example of a trellis diagram of until the time index i=3 when L=1 and selection metrics in the trellis diagram. As aforementioned, $f^{(m(i))}(y(i))$ refers to a conditional probability with respect to the received signal y(i) in the state m(i) which may be identical to f(y(i)|m(i)) described above.

Quantities of the selection metrics may be compared as follows. When $\Lambda_1(2) > \Lambda_3(2)$ & $\Lambda_2(2) < \Lambda_4(2)$ is satisfied, states $S_1$ and $S_4$ may be selected. As aforementioned, the quantity comparison between the selection metrics may be performed in state-pairs of which only the most previous bit information is different.

Reflecting the above, the survivor metrics $\lambda_a(2)$ and $\lambda_b(2)$ of until the transmission time index i=2, and the selection metric $\Lambda_k(3)$ corresponding to the state trellis diagram and respective paths of until the transmission time index i=3 may be expressed as shown in FIG. 8. Since $S_1$ and $S_4$ are selected when i=2, the survivor paths until i=2 may be $\lambda_a(2)=\Lambda_1(2)$ and $\lambda_b(2)=\Lambda_4(2)$, respectively. Selection metrics of when i=3 may be calculated as aforementioned based on the survivor metrics of when i=2.

Figure 9:
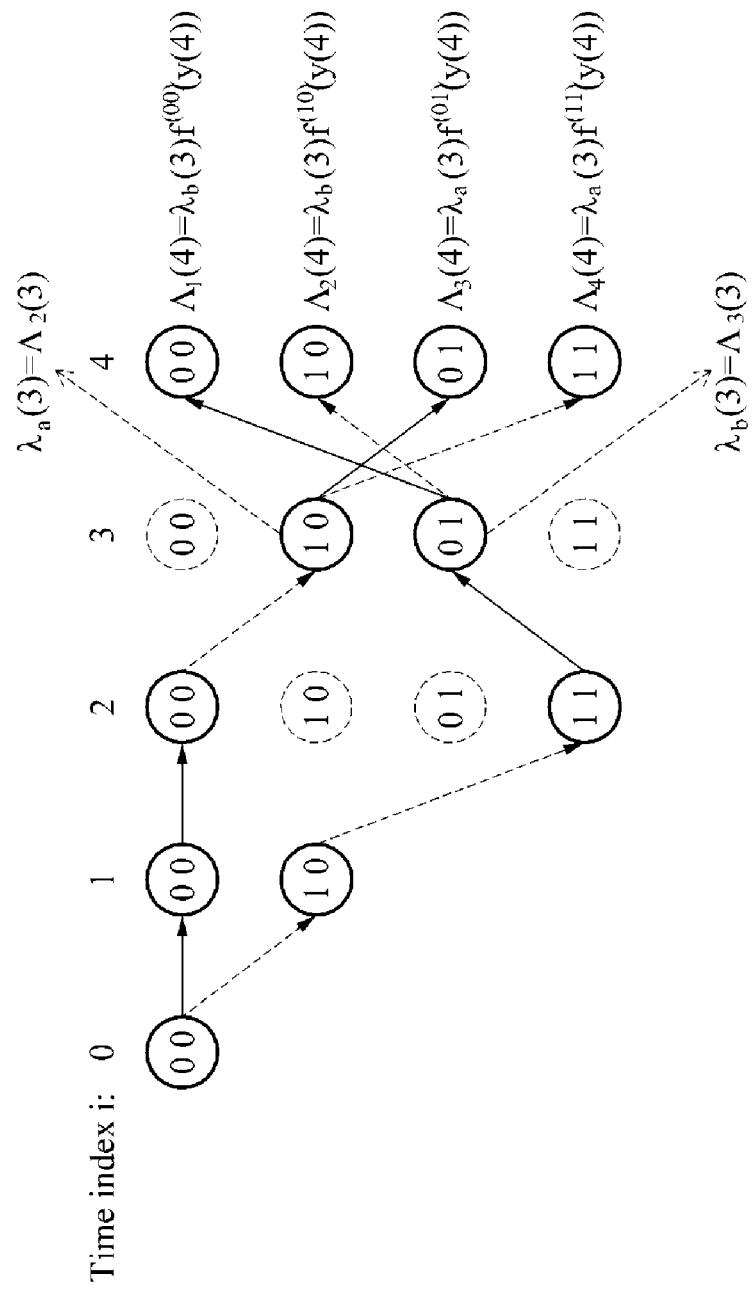
FIG. 9 is a diagram illustrating an example of a trellis diagram of until a time index i=4 when L=1, and selection metrics in the trellis diagram.

FIG. 9 illustrates an example of a trellis diagram of until the time index i=4 when L=1 and selection metrics in the trellis diagram. When $\Lambda_1(3) < \Lambda_3(3)$ & $\Lambda_2(3) > \Lambda_4(3)$ is satisfied, states $S_2$ and $S_3$ may be selected through quantity comparison between the selection metrics.

Therefore, the survivor metrics $\lambda_a(3)$ and $\lambda_b(3)$ of until the transmission time index i=3, and the selection metric $\Lambda_k(4)$ corresponding to the state trellis diagram and respective paths of until the transmission time index i=4 may be expressed as shown in FIG. 9. Since $S_2$ and $S_3$ are selected when i=3 in FIG. 9, the survivor paths until i=3 may be $\lambda_a(3)=\Lambda_2(3)$ and $\lambda_b(3)=\Lambda_3(3)$, respectively. Selection metrics of when i=4 may be calculated as aforementioned based on the survivor metrics of when i=3.

In this example, crossover may occur during the transition from the states $S_2$ and $S_3$ selected when i=3 to states of when i=4. Therefore, $\Lambda_1(4)$ and $\Lambda_2(4)$ may use $\lambda_b(3)$ rather than $\lambda_a(3)$, and $\Lambda_3(4)$ and $\Lambda_4(4)$ may use $\lambda_a(3)$ rather than $\lambda_b(3)$.

Figure 10:
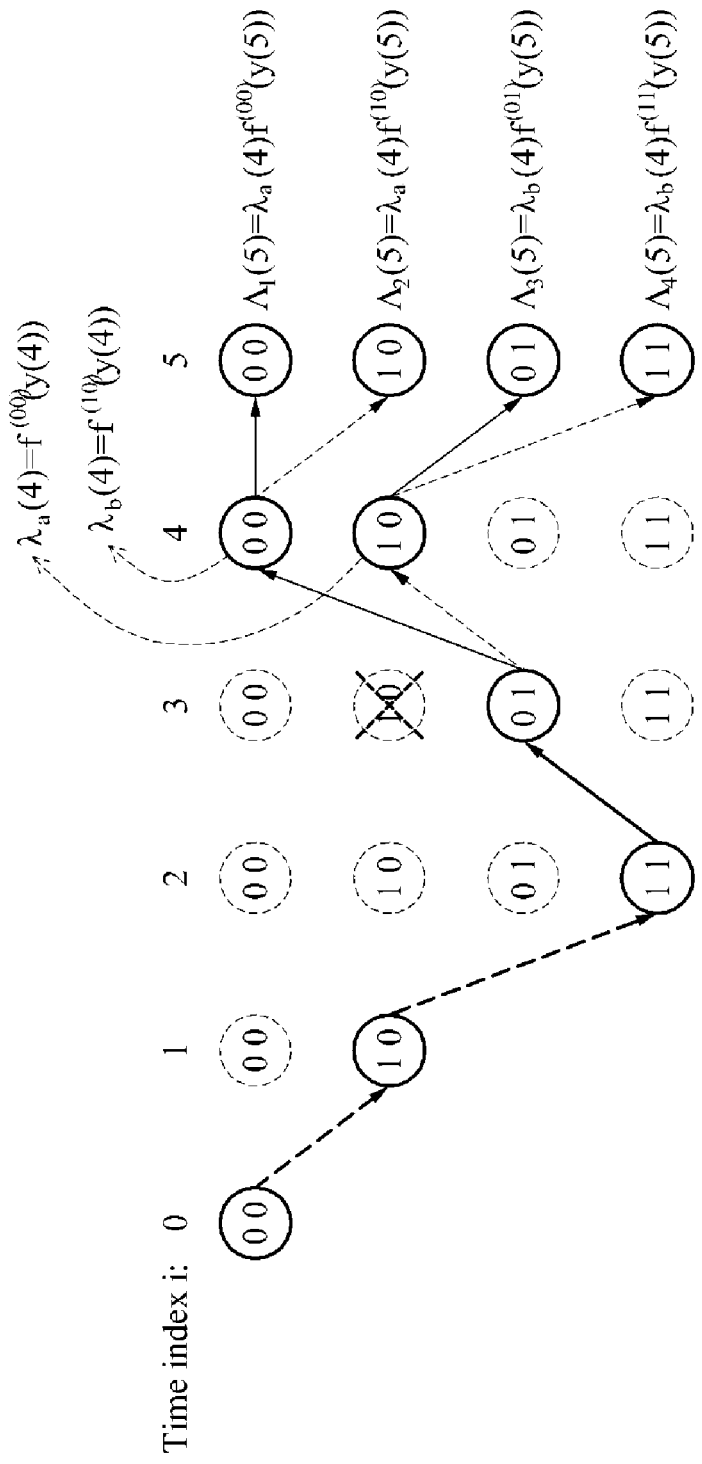
FIG. 10 is a diagram illustrating an example of a trellis diagram of until a time index i=5 when L=1, and selection metrics in the trellis diagram.

FIG. 10 illustrates an example of a trellis diagram of until the time index i=5 when L=1 and selection metrics in the trellis diagram. When $\Lambda_1(4) > \Lambda_3(4)$ & $\Lambda_2(4) > \Lambda_4(4)$ is satisfied as a result of quantity comparison between the selection metrics, the states $S_1$ and $S_2$ may be selected.

Reflecting the above, the survivor metrics $\lambda_a(4)$ and $\lambda_b(4)$ of until the transmission time index i=4, and the selection metric $\Lambda_k(5)$ corresponding to the state trellis diagram and respective paths of until the transmission time index i=5 may be expressed as shown in FIG. 10. The states $S_1$ and $S_2$ may be the state-pair of which only the latest bit information is different.

Therefore, as aforementioned, one of states selected in the previous level, that is, when i=3, may be additionally canceled. In this example, the state $S_2$ of when i=3 may be additionally canceled, which is connected to $S_3$ and $S_4$ when i=4. Since the number of the survivor state until i=3 is one, the detection window update may be performed.

Figure 12:
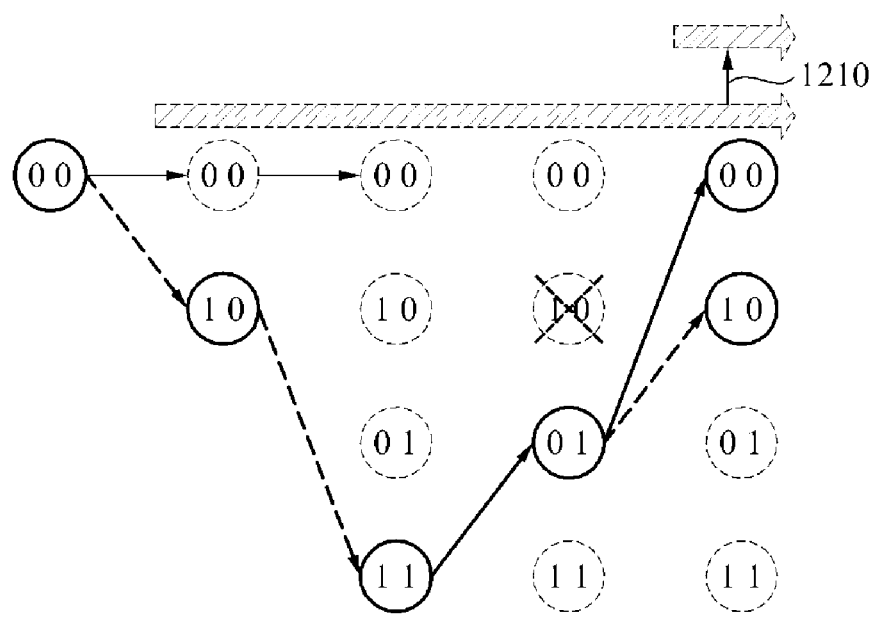
FIG. 12 is a diagram illustrating an example of a method of setting a new detection window.

That is, the new detection window may be set from i=4 as in operation 1210 of FIG. 12. All bit sequences may be determined with respect to one survivor path of until i=3 to overcome a limited memory. In this example, the path connected to the state $S_2$ when i=3 may be ignored and another path may be updated as the survivor path. When all bit sequences are determined with respect to the one survivor path of until i=3, the update of the survivor path may be performed by only new path information of from i=4.

In addition, since the number of the survivor path of until i=3 is one, the survivor metrics may also be updated to $\lambda_a(4)=f^{(00)}(y(4))$ and $\lambda_b(4)=f^{(10)}(y(4))$ except the common conditional symbol probability value. In this example, when the common values are accumulated, the bit to be allocated to a corresponding variable is increased. Therefore, the common conditional probability is excluded to prevent the increase.

However, the selection metrics may be set to $\lambda_a(4)=\Lambda_1(4)$ and $\lambda_b(4)=\Lambda_2(4)$ by including the common values of until i=3. The selection metric of when i=5 may be calculated as aforementioned based on the survivor metric of when i=4. The foregoing process may be repeated until a time index of a last transmission bit.

When the time index corresponds to the last transmission bit, a path corresponding to a largest value among four selection metrics may be selected to detect a final bit sequence and complete the operation. Thus, when L=1, the maximum number of different states may be four.

Therefore, after signal processing of the current level half-cardinality state selection based on the state-pairs is performed, two states may be selected. That is, after the state selection at each time index is performed, the maximum number of paths to be considered may be two.

When the selected state-pair is {[0 0], [1 0]} or {[0 1], [1 1]}, one of the states selected in the previous level may be additionally canceled. However, since the survivor state is only one, signal processing of the detection window update may be automatically performed. Based on the above characteristics, a method with respect to a case in which L=1 may be more simply expressed as shown in FIG. 11.

Figure 11:
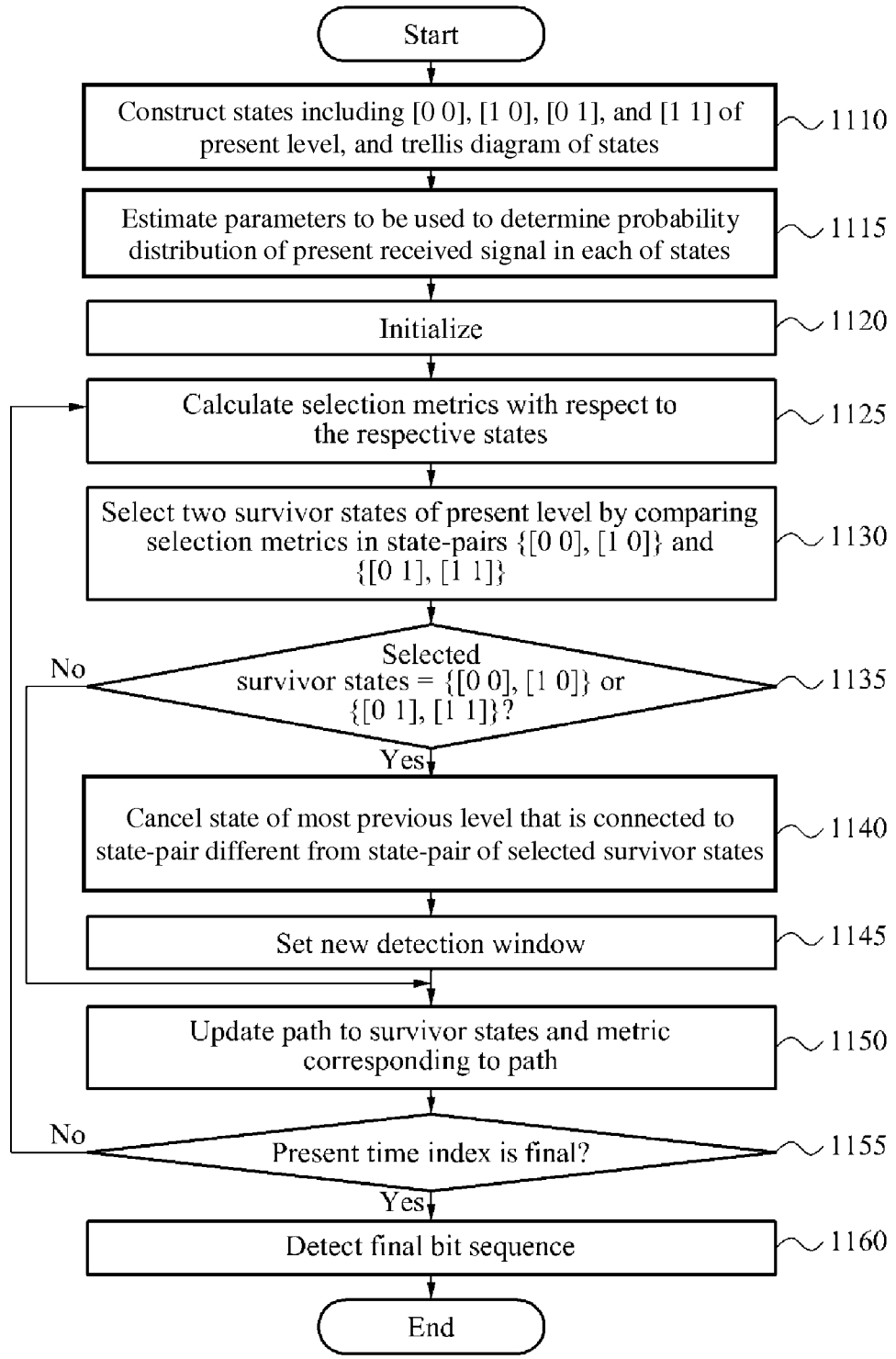
FIG. 11 is a flowchart illustrating an example of a method of detecting a bit sequence when L=1.

FIG. 11 an example of a method of detecting a bit sequence when L=1. Referring to FIG. 11, when L=1, in operation 1110, a detection apparatus constructs states including [0 0], [1 0], [0 1], and [1 1] of a present level, and a trellis diagram of the states.

In operation 1115, the detection apparatus estimates parameters to be used to determine a probability distribution of a present received signal in each of the states. The detection apparatus may use a preamble of a predetermined data pattern to estimate the parameters.

In operation 1120, the detection apparatus initializes the method of detecting the bit sequence. During the initialization, a value corresponding to an initial state may be set in constructing the trellis diagram. During the initialization, transmission bit values in the preamble during transmission and reception may be used.

In operation 1125, the detection apparatus calculates selection metrics with respect to the respective states based on the estimated parameters. The selection metrics may be expressed as when the time index i=2 in FIG. 7. Each of the selection metrics includes the probability distribution that the present received signal is observed in the respective state.

In operation 1130, the detection apparatus selects two survivor states of a present level, each of which includes a relatively high occurrence rate, among the states, based on the selection metrics of respective states in each of state-pairs. In more detail, the detection apparatus selects the two survivor states of the present level by comparing the selection metrics of respective states in each of state-pairs of which only most previous bit information are different, among the state-pairs. For example, the detection apparatus may select the two survivor states of the present level by comparing the selection metrics in state-pairs {[0 0], [0 1]} and {[1 0], [1 1]}, respectively. This may be expressed as when the time index i=2 in FIG. 8.

In operation 1135, the detection apparatus determines whether the selected survivor states are equal to, for example, the state-pair {[0 0], [0 1]} or {[1 0], [1 1]}. When the selected survivor states are determined to be equal to the state-pair {[0 0], [0 1]} or {[1 0], [1 1]}, the detection apparatus continues in operation 1140. Otherwise, the detection apparatus continues in operation 1150.

In operation 1140, the detection apparatus cancels a state of a most previous level that is connected to a state-pair different from the state-pair of the selected survivor states.

In operation 1145, the detection apparatus estimates the bit sequence until the most previous level, and sets a new detection window to newly estimate the bit sequence from the present level.

In operation 1150, the detection apparatus updates a path to each of the survivor states that reflect the state that is canceled, and a metric corresponding to the path to each of the survivor states. Various methods may be used for the update. Also, after the state is canceled in operation 1140, the detection apparatus may store connection information of the survivor states along with the path, which refers to the update of the path to each of the survivor states. In addition, the detection apparatus may store and update the selection metrics related to the path, which refers to the update of the metric corresponding to the path to each of the survivor states.

In operation 1155, the detection apparatus determines whether the present time index is final. When the present time index is determined to be final, the detection apparatus continues in operation 1160. Otherwise, the detection apparatus returns to operation 1125.

In operation 1160, the detection apparatus detects a final bit sequence based on the path to each of the survivor states that reflect the state that is canceled.

In this example, presuming that a conditional probability $f^{(s_k)}(y(i))$ with respect to a received signal y(i) in a provided state $S_k$ accords to the Gaussian probability f) distribution, when L=1, the conditional probability $f^{(s_k)}(y(i))$ may be expressed by the following example of Equation 4:

$$f^{(00)}(y(i)) = \frac{1}{\sqrt{2\pi\sigma_{00}^2}} \exp\left(-\frac{(y(i)-\mu_{00})^2}{2\sigma_{00}^2}\right)$$

$$f^{(10)}(y(i)) = \frac{1}{\sqrt{2\pi\sigma_{10}^2}} \exp\left(-\frac{(y(i)-\mu_{10})^2}{2\sigma_{10}^2}\right)$$

$$f^{(01)}(y(i)) = \frac{1}{\sqrt{2\pi\sigma_{01}^2}} \exp\left(-\frac{(y(i)-\mu_{01})^2}{2\sigma_{01}^2}\right)$$

$$f^{(11)}(y(i)) = \frac{1}{\sqrt{2\pi\sigma_{11}^2}} \exp\left(-\frac{(y(i)-\mu_{11})^2}{2\sigma_{11}^2}\right)$$

(4)

In Equation 4, $\mu_{s_k}$ and $\sigma_{s_k}^2$ denote a mean and a distribution, respectively, of the conditional probability $f^{(s_k)}(y(i))$, in the state $S_k$.

In this example, an overall conditional probability of a path used for the selection metrics and the survivor states may be expressed by accumulating products of the conditional probabilities at the respective time indexes every time the time index is increased. This may refer to a multiplicative metric method. However, a multiplier may increase complexity when actually applied. To this end, an additive metric method may be used, which adds a value of the present time index to an accumulated value up to the previous time index.

The additive metric method may be achieved by applying a logarithm function to the conditional probability. That is, the principle of log(xy)=log(x)+log(y) may be used. A natural logarithm function is applied to the conditional probability may be expressed as the following example of Equation 5:

$$\ln(f^{(00)}(y(i))) = -\frac{(y(i)-\mu_{00})^2}{2\sigma_{00}^2} - \frac{1}{2}\ln(2\pi\sigma_{00}^2)$$

$$\ln(f^{(10)}(y(i))) = -\frac{(y(i)-\mu_{10})^2}{2\sigma_{10}^2} - \frac{1}{2}\ln(2\pi\sigma_{10}^2)$$

$$\ln(f^{(01)}(y(i))) = -\frac{(y(i)-\mu_{01})^2}{2\sigma_{01}^2} - \frac{1}{2}\ln(2\pi\sigma_{01}^2)$$

$$\ln(f^{(11)}(y(i))) = -\frac{(y(i)-\mu_{11})^2}{2\sigma_{11}^2} - \frac{1}{2}\ln(2\pi\sigma_{11}^2)$$

(5)

Using the above function $\ln(f^{(s_k)}(y(i)))$, the selection metric may be obtained by adding the value of the present time index to the accumulated value up to the previous time index. In addition, to reduce complexity in both the multiplicative metric method and the additive metric method, signal processing may be performed by excluding common sum term and product term from $f^{(s_k)}(y(i))$ and $\ln(f^{(s_k)}(y(i)))$.

FIG. 12 illustrates an example of a method of setting a new detection window. Referring to FIGS. 10 and 12, when i=4, the state-pair $S_1$ and $S_2$ of which only latest bit information is different is selected. One of states selected in the previous level, that is, when i=3, is canceled. The canceled state is $S_2$ of when i=3, connected to states $S_3$ and $S_4$ when i=4. Since the number of a survivor state until i=3 is one, the detection window update is performed. That is, the new detection window is set from when i=4 as in operation 1210.

Figure 13:
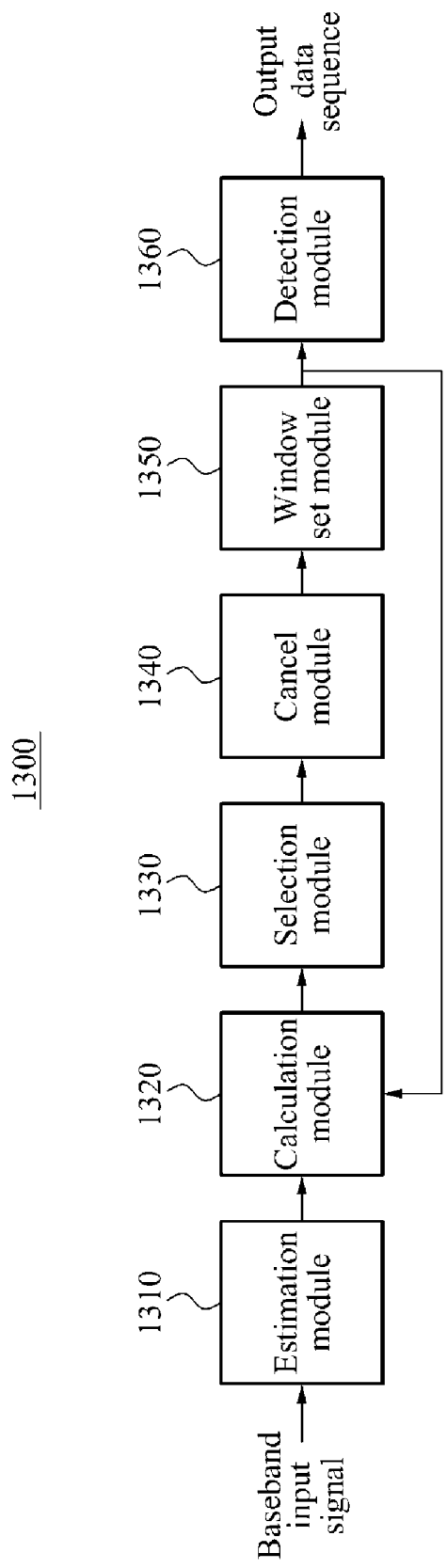
FIG. 13 is a block diagram illustrating an example of an apparatus that detects a bit sequence.

FIG. 13 illustrates an example of an apparatus 1300 that detects a bit sequence. Referring to FIG. 13, the detection apparatus 1300 includes an estimation module 1310, a calculation module 1320, a selection module 1330, a cancel module 1340, a window set module 1350, and a detection module 1360.

The estimation module 1310 estimates parameters to be used to determine a probability distribution of a present received signal (e.g., a baseband input signal) in each of states of a present level. Each of the states includes a present transmission bit and at least one previous transmission bit. The estimation module 1310 may estimate the parameters based on a preamble of a predetermined data pattern.

The calculation module 1320 calculates selection metrics of the respective states based on the parameters. Each of the selection metrics includes the probability distribution that the present received signal is observed in the respective state.

The selection module 1330 selects survivor states, each of which includes a relatively high occurrence rate, among the states, based on the selection metrics of respective states in each of state-pairs. In more detail, the selection module 1330 selects the survivor states by comparing the selection metrics of respective states in each of state-pairs of which only most previous bit information are different, among the state-pairs.

The cancel module 1340 cancels any one of states selected in a previous level based on a latest received bit symbol included in each of the selected survivor states.

The window set module 1350 sets a new detection window to start from the present level based on a number of states remaining in the previous level. When the number of states remaining in the previous level is reduced to 1, the window set module 1350 may perform signal processing for a detection window update to set the new detection window for the present level. To overcome a limited memory, the detection apparatus 1300 may determine all bit sequence information up to the previous level.

When the received signal with respect to the transmission bit is obtained, the detection apparatus 1300 repeats the operation from the calculation of the selection metrics by the calculation module 1320. After processing a received signal with respect to a last transmission bit in a packet, the detection apparatus 1300 ends the operation.

The detection module 1360 detects the bit sequence based on a path to each of the survivor states that reflects that the state is canceled. The detection module 1360 outputs the detected bit sequence, e.g., an output data sequence.

Figure 14:
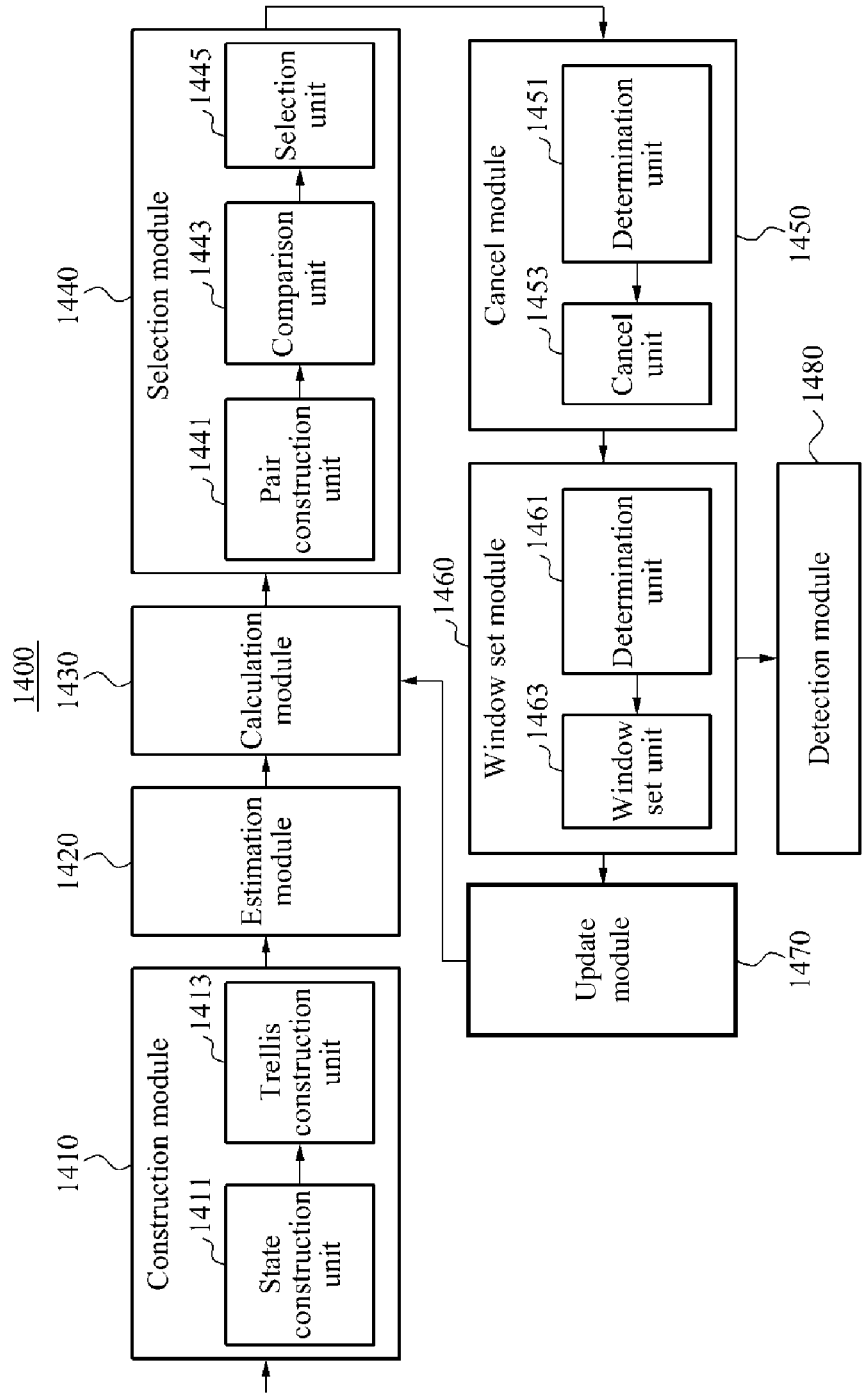
FIG. 14 is a block diagram illustrating another example of an apparatus that detects a bit sequence.

FIG. 14 illustrates another example of an apparatus 1400 that detects a bit sequence. Referring to FIG. 14, the detection apparatus 1400 includes a construction module 1410, an estimation module 1420, a calculation module 1430, a selection module 1440, a cancel module 1450, a window set module 1460, an update module 1470, and a detection module 1480.

The construction module 1410 constructs a trellis diagram including states of a present level, each of which includes a present transmission bit and at least one previous transmission bit that influence a probability distribution of a present received signal. The construction module 1410 constructs the trellis diagram based on the states including previous transmission bit information and present transmission bit information, and transitions between the states.

The construction module 1410 includes a state construction unit 1411 and a trellis construction unit 1413. The state construction unit 1411 constructs the states based on the present transmission bit and the at least one previous transmission bit that influences the probability distribution of the present received signal, of each of the states. The trellis construction unit 1413 constructs the trellis diagram based on the transitions between states that are generated.

The estimation module 1420 estimates parameters to be used to determine the probability distribution of the present received signal in each of the states. The estimation of the parameters may be performed using a preamble of a predetermined data pattern. The probability distribution may be a conditional, statistical probability distribution of a baseband input signal passed through an ADC.

The calculation module 1430 calculates selection metrics of the respective states based on the parameters. That is, the calculation module 1430 calculates values, each of which includes the probability distribution that the present received signal is observed in the respective state.

The selection module 1440 selects survivor states, each of which includes a relatively high occurrence rate, among the states, based on the selection metrics of respective states in each of state-pairs. In more detail, the selection module 1440 selects the survivor states by comparing the selection metrics of respective states in each of state-pairs of which only most previous bit information are different, among the state-pairs. Through a signal processing of selecting the survivor states, a number of the selected states may be reduced to about ½ from a total number of the states.

The selection module 1440 includes a pair construction unit 1441, a comparison unit 1443, and a selection unit 1445. The pair construction unit 1441 constructs the state-pairs of which only the most previous bit information are different while all other bit information are the same. The comparison unit 1443 compares the selection metrics of the respective states in each of the constructed state-pairs. The selection unit 1445 selects the survivor states, each of which includes the relatively high occurrence rate, based on a result of the comparison of the comparison unit 1443.

The cancel module 1450 cancels any one state among states selected in a previous level based on a latest received bit symbol included in each of the survivor states selected by the selection module 1440. The cancel module 1450 includes a determination unit 1451 and a cancel unit 1453. The determination unit 1451 determines whether the selected survivor states include any of state-pairs of which only a latest received bit symbol is different while all other bit symbols are the same. The cancel unit 1453 cancels any one of the states selected from the previous level based on a result of the determination of the determination unit 1451.

The window set module 1460 sets a new detection window to start from the present level based on a number of states remaining in the previous level. When the number of the states remaining in the previous level is reduced to one, the window set module 1460 may perform signal processing for a detection window update to set the new detection window for the present level.

The window set module 1460 includes a determination unit 1461 and a window set unit 1463. The determination unit 1461 determines whether the number of the states remaining in the previous level is one. When the number of the remaining states is determined to be by the determination unit 1461, the window set unit 1463 sets the new detection window with respect to the state-pairs of the states from the present level.

The update module 1470 updates a path to each of the survivor states that reflects that the state is canceled, and a metric corresponding to the path to each of the survivor states.

The detection module 1480 detects the bit sequence based on the path to each of the survivor states that reflects that the state is canceled.

The examples of a method of detecting an optimal bit sequence that are described may improve a bit error rate. As a result, transmission power of a transmitter may be reduced, and reception sensitivity of a receiver may be increased.

The various units, modules, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a bit sequence, the method comprising:
   estimating parameters to be used to determine a probability distribution of a present signal in each of states of a present time;
   calculating metrics of the respective states based on the parameters;
   selecting survivor states from the states based on the metrics; and
   detecting the bit sequence based on a path to each of the survivor states.

2. The method of claim 1, wherein each of the states comprises a present transmission bit and a previous transmission bit.

3. The method of claim 1, wherein the estimating of the parameters comprises:
   estimating the parameters based on a preamble of a predetermined data pattern.

4. The method of claim 1, wherein each of the metrics comprises the probability distribution that the present signal is observed in a respective one of the states.

5. The method of claim 1, further comprising:
   constructing a trellis diagram comprising the states, each of the states influencing the probability distribution of the present signal.

6. The method of claim 5, wherein the constructing of the trellis diagram comprises:
   constructing the states and one or more previous states; and
   constructing the trellis diagram based on transitions between the states and the one or more previous states.

7. The method of claim 1, wherein the selecting of the survivor states comprises:
   comparing the metrics of the respective states in each of state-pairs of which only most previous bits are different to select the survivor states, each of the survivor states comprising a relatively high occurrence rate.

8. The method of claim 1, wherein the selecting of the survivor states comprises:
   constructing state-pairs of the states, of which only most previous bits are different;
   comparing the metrics of the respective states in each of the state-pairs; and
   selecting the survivor states based on a result of the comparing of the metrics, each of the survivor states comprising a relatively high occurrence rate.

9. The method of claim 1, further comprising:
   determining whether the survivor states comprise only different latest bits; and
   removing a state from previously-selected states in response to the survivor states being determined to comprise only the different latest bits.

10. The method of claim 9, further comprising:
    updating the path reflecting that the state is removed, and a metric of the path,
    wherein the detecting of the bit sequence comprises detecting the bit sequence based on the updated path.

11. The method of claim 1, further comprising:
    setting a detection window to start from the present time based on a number of states remaining in a previous time.

12. The method of claim 1, further comprising:
    determining whether a number of states remaining in a previous time is one; and
    setting a detection window to start from the present time in response to the number of the remaining states being determined to be one.

13. A non-transitory computer-readable storage medium storing a program comprising instructions to cause a computer to implement the method of claim 1.

14. An apparatus that detects a bit sequence, the apparatus comprising:
    a processor comprising:
        an estimation module configured to estimate parameters to be used to determine a probability distribution of a present signal in each of states of a present time;
        a calculation module configured to calculate metrics of the respective states based on the parameters;
        a selection module configured to select survivor states from the states based on the metrics; and
        a detection module configured to detect the bit sequence based on a path to each of the survivor states.

15. The apparatus of claim 14, wherein each of the states comprises a present transmission bit and a previous transmission bit.

16. The apparatus of claim 14, wherein the estimation module is further configured to:
    estimate the parameters based on a preamble of a predetermined data pattern.

17. The apparatus of claim 14, wherein each of the metrics comprises the probability distribution that the present signal is observed in a respective one of the states.

18. The apparatus of claim 14, wherein the processor further comprises:
    a construction module configured to construct a trellis diagram comprising the states, each of the states influencing the probability distribution of the present signal.

19. The apparatus of claim 18, wherein the construction module comprises:
    a state construction unit configured to construct the states and one or more previous states; and
    a trellis construction unit configured to construct the trellis diagram based on transitions between the states and the one or more previous states.

20. The apparatus of claim 14, wherein the selection module is further configured to:
    compare the metrics of the respective states in each of state-pairs of which only most previous bits are different to select the survivor states, each of the survivor states comprising a relatively high occurrence rate.

21. The apparatus of claim 14, wherein the selection module comprises:
    a pair construction unit configured to construct state-pairs of the states, of which only most previous bits are different;
    a comparison unit configured to compare the metrics of the respective states in each of the state-pairs; and
    a selection unit configured to select the survivor states based on a result of the comparison of the metrics, each of the survivor states comprising a relatively high occurrence rate.

22. The apparatus of claim 14, wherein the processor further comprises:
- a determination unit configured to determine whether the survivor states comprise only different latest bits; and
- a removal unit configured to remove a state from previously-selected states in response to the survivor states being determined to comprise only the different latest bits.

23. The apparatus of claim 22, wherein the processor further comprises:
- an update module configured to update the path reflecting that the state is removed, and a metric of the path,
- wherein the detection module is further configured to detect the bit sequence based on the updated path.

24. The apparatus of claim 14, wherein the processor further comprises:
- a window set module configured to set a detection window to start from the present time based on a number of states remaining in a previous time.

25. The apparatus of claim 14, wherein the processor further comprises:
- a determination unit configured to determine whether a number of states remaining in a previous time is one; and
- a window set unit configured to set a detection window to start from the present time in response to the number of the remaining states being determined to be one.

* * * * *